US007332704B2

(12) United States Patent
Lien et al.

(10) Patent No.: US 7,332,704 B2
(45) Date of Patent: Feb. 19, 2008

(54) PHOTOSENSITIVE BUTTON STRUCTURE

(75) Inventors: Yu-Yen Lien, Taipei County (TW); Chien-Hsin Wu, Taipei County (TW); Wun-Jhih Tsai, Taipei County (TW); Chien-Chia Chen, Taipei County (TW)

(73) Assignee: Silitech Technology Corp., Taipei Hsien (TW)

( * ) Notice: Subject to any disclaimer, the term of this patent is extended or adjusted under 35 U.S.C. 154(b) by 137 days.

(21) Appl. No.: 11/250,385

(22) Filed: Oct. 17, 2005

(65) Prior Publication Data

US 2006/0169874 A1 Aug. 3, 2006

(30) Foreign Application Priority Data

Jan. 28, 2005 (TW) .............................. 94201645 U

(51) Int. Cl.
*H01J 40/14* (2006.01)
*G01J 1/42* (2006.01)

(52) U.S. Cl. .................. 250/215; 250/221; 250/222.1; 356/221

(58) Field of Classification Search ................ 250/221, 250/222.1, 205, 215; 356/221, 234
See application file for complete search history.

(56) References Cited

U.S. PATENT DOCUMENTS 5,291,056 A * 3/1994 Howson ..................... 257/442
2002/0112942 A1* 8/2002 Galmiche et al. ........... 200/5 R

* cited by examiner

*Primary Examiner*—Georgia Epps
*Assistant Examiner*—Don Williams
(74) *Attorney, Agent, or Firm*—Rosenberg, Klein & Lee

(57) ABSTRACT

A photosensitive button structure includes a button body and a photosensitive layer. The photosensitive layer is disposed on a bottom side of the button body, and has a plurality of words and pictures formed thereon. Whereby, the photosensitive layer produces a first color change by absorbing light from one angle, and then produces a second color change or more than two color changes by absorbing light from another angle, in order to produce a dual mode visual effect. The present invention solves problems and the defects of the traditional button having only one fixed color, and that the color of the traditional button can only be changed once, because the photosensitive layer can absorb light from different angles. Hence, the present invention not only improves the appearance of the button body, but can also show more than two color changes of any words or pictures on the button structure.

7 Claims, 2 Drawing Sheets

PHOTOSENSITIVE BUTTON STRUCTURE

BACKGROUND OF THE INVENTION

1. Field of the Invention

The present invention relates to a photosensitive button structure, and particularly relates to a photosensitive button structure having a photosensitive layer for absorbing light from different angles in order to produce color changes, and a dual mode visual effect on a button body.

2. Description of the Related Art

In general, a traditional button has a fixed color that is decided in the manufacture process and cannot be changed thereafter. If the color of the button needs to be changed, the general method is to dispose a light-emitting element under the button. When the color of the light-emitting element changes, the color of the button is changed.

However, the color of the button with the light-emitting element can only be changed once, and the manufacturing cost of the button with the light-emitting element is increased.

SUMMARY OF THE INVENTION

The present invention provides a photosensitive button structure. The photosensitive button structure has a photosensitive layer for absorbing light from different angles, in order to produce color changes and a dual mode visual effect on a button body. Furthermore, any words, characters or images on the button will be clearly visible while the background color can be changed because of their dual mode visual effect. Hence, the present invention not only improves the appearance of the button body, but can also display more than two color changes of the words and/or the pictures.

One aspect of the invention is a photosensitive button structure. The photosensitive button structure includes a button body and a photosensitive layer. The photosensitive layer is disposed on a bottom side of the button body, and has a plurality of words and pictures formed thereon. Whereby, the photosensitive layer produces a first color change by absorbing a light source. The photosensitive layer then produces a second color change or more than two color changes by absorbing light from another angle, in order to produce a dual mode visual effect.

It is to be understood that both the foregoing general description and the following detailed description are exemplary, and are intended to provide further explanation of the invention as claimed. Other advantages and features of the invention will be apparent from the following description, drawings and claims.

BRIEF DESCRIPTION OF THE DRAWINGS

The various objects and advantages of the present invention will be more readily understood from the following detailed description when read in conjunction with the appended drawing, in which.

DETAILED DESCRIPTION OF PREFERRED EMBODIMENTS

Figure 1:
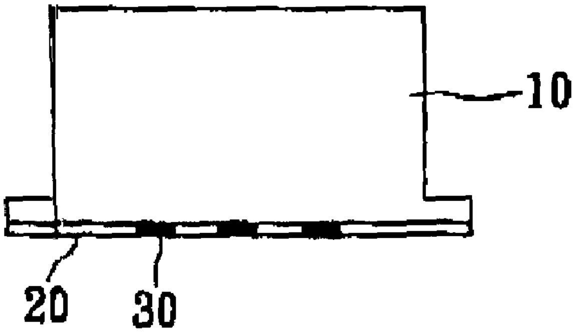
FIG. 1 is a side, schematic view of a photosensitive button structure according to the present invention.

FIG. 1 shows a side, schematic view of a photosensitive button structure according to the present invention. The photosensitive button structure includes a button body 10 and a photosensitive layer 20.

The button body 10 is made of a plastic or resin materials. The photosensitive layer 20 is made of a uniform mixture of photosensitive material, and printing ink or paint. Moreover, the photosensitive layer 20 is disposed on the bottom side of the button body 10 by a printing or a coating method. Furthermore, the photosensitive layer 20 has a plurality of words 30 or pictures (not shown) formed thereon by a printing or a laser carving method.

Figure 2:
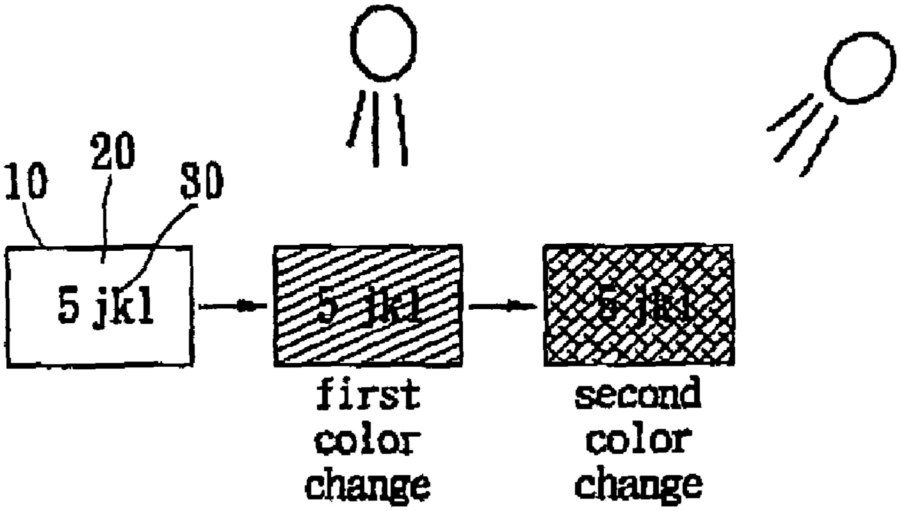
FIG. 2 is a top, schematic view of a photosensitive button structure according to the first embodiment of the present invention.
Figure 3:
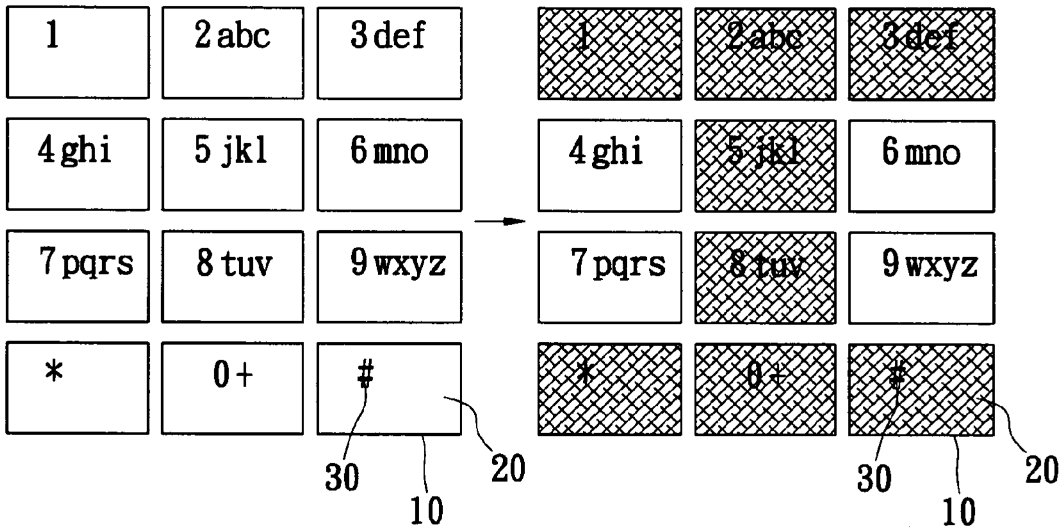
FIG. 3 is a top, schematic view of a photosensitive button structure according to the second embodiment of the present invention.

FIGS. 2 and 3 respectively show a top, schematic view of a photosensitive button structure according to the first and the second embodiments of the present invention. Referring to FIG. 2, the photosensitive layer 20 produces a first color change by absorbing a light source, and then produces a second color change or more than two color changes by absorbing light from a another angle, in order to produce a dual mode visual effect on the button body 10, or clearly show the words 30 and background color (the photosensitive layer 20) because of their dual mode visual effect. Referring to FIG. 3, the photosensitive layers 20 can be respectively disposed on different button bodies 10 to clearly show the words 30, when the photosensitive layers 20 absorbs light from different angles.

The present invention solves the problem and the defect that traditional buttons have only one fixed color, or that the color of the traditional button can only be changed once as the photosensitive layer 20 is able to absorb light from different angles and display a dual mode visual effect. The present invention not only improves the appearance of the button body 10, but it also allows more than two color changes of words or pictures to be displayed on a button body 10.

Although the present invention has been described with reference to the preferred embodiments thereof, it will be understood that the invention is not limited to the details thereof. Various substitutions and modifications have been suggested in the foregoing description, and others will occur to those of ordinary skill in the art. Therefore, all such substitutions and modifications are intended to be embraced within the scope of the invention as defined in the appended claims.

The invention claimed is:

1. A photosensitive button structure comprising:

a button body; and a photosensitive layer disposed on a bottom side of the button body, and having at least one of a word and picture formed thereon;

whereby, the photosensitive layer produces a first color by absorbing light from a light source at a first angle relative to the photosensitive layer, and then produces at least a second different color by absorbing different light from a different angle, in order to produce a dual mode visual effect for the photosensitive button structure.

2. The photosensitive button structure as claimed in claim 1, wherein the button body is made of plastic or resin materials.

3. The photosensitive button structure as claimed in claim 1, wherein the photosensitive layer is made of a uniform mixture of photosensitive material and printing ink.

4. The photosensitive button structure as claimed in claim 1, wherein the photosensitive layer is made of uniform mixture of photosensitive material and paint.

5. The photosensitive button structure as claimed in claim 1, wherein the photosensitive layer is disposed on the bottom side of the button body by a printing or a coating method.

6. The photosensitive button structure as claimed in claim 1, wherein the words and pictures are formed on the photosensitive layer by a printing or a laser carving method.

7. The photosensitive button structure as claimed in claim 1, wherein the light source is located above the photosensitive button structure.

* * * * *